United States Patent Office 3,251,805
Patented May 17, 1966

3,251,805
POLYESTERS FROM TRIARYL-DIHYDROXY COMPOUNDS
Hermann Schnell, Krefeld-Uerdingen, and Gerhard Fritz and Ludwig Bottenbruch, Krefeld-Bockum, Germany, assignors to Farbenfabriken Bayer Aktiengesellschaft, Leverkusen, Germany, a corporation of Germany
No Drawing. Filed May 1, 1962, Ser. No. 191,454
Claims priority, application Germany, May 4, 1961, F 33,843
5 Claims. (Cl. 260—47)

This invention is concerned with polyesters and more particularly with new, improved linear polyesters and a process for the production thereof.

It is known to prepare polyesters by reacting polyhydric alcohol and a polycarboxylic acid. In such a process, the hydroxyl groups of the polyhydric alcohol react with the carboxyl groups of the carboxylic acid to form ester linkages and water. It is also known to prepare polyesters by reacting a dicarboxylic acid chloride with an organic dihydroxy compound such as an aromatic dihydroxy compound or a polyhydric alcohol to prepare high molecular weight polyesters. Phosgene and dicarboxylic acid chlorides may also be reacted with an organic dihydroxy compound to produce a polyester which will contain dicarboxylic acid and carbonic acid residues. Polyesters can also be prepared by heating dicarboxylic acids with diaryl carbonates and organic dihydroxy compounds or with bis-carbonic acid aryl esters of organic dihydroxy compounds, preferably in the presence of catalytic amounts of alkali metal or alkaline metal earth compounds. The polyesters prepared according to the above-mentioned procedures have low resistance to water absorption. This ability to absorb water often influences the dimensional and chemical stability as well as the electrical and mechanical properties of the polyesters.

It is therefore an object of this invention to provide new and improved linear polyesters which are resistant to saponification and take up only a very small amount of water.

The foregoing objects and others are accomplished in accordance with this invention, generally speaking, by providing a process for preparing linear polyesters wherein an organic triaryldihydroxy compound is reacted with any suitable dicarboxylic acid or an ester forming derivative thereof or with any suitable carbonic acid derivative. The polyester formed by the aforementioned process will have repeating ester linkages.

Any suitable organic triaryldihydroxy compound having the following preferred general formula may be used:

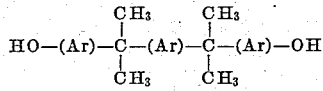

where (Ar) is an arylene radical. (Ar) may be substituted or unsubstituted as illustrated by the following general examples:

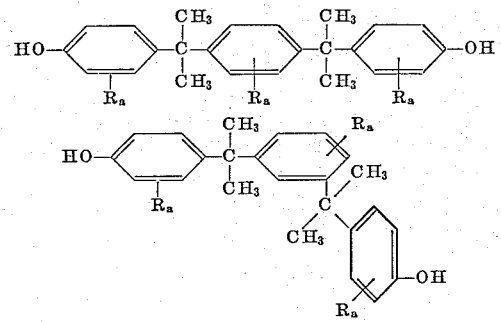

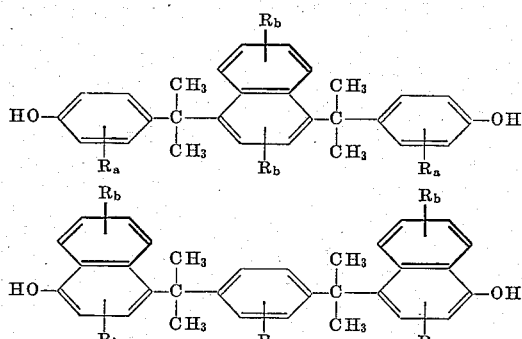

The radical, R, in the above formulas may be halogen such as fluorine, chlorine and bromine, and any suitable organic radical. R may be the same or it may be different, $a$ may be from 0 to 4 and $b$ may be from 0 to 2. The term "organic radical" includes aliphatic, cycloaliphatic, aromatic and heterocyclic radicals and substituted derivatives thereof. The organic radicals may be substituted with any suitable substituent, such as, for example, halogeno such as, for example, chloro, bromo, iodo, fluoro and the like; nitro; alkoxy such as, for example, methoxy, ethoxy, propoxy, butoxy, amoxy and the like; carboalkoxy such as, for example, carbomethoxy, carbethoxy and the like; dialkyl amino such as, for example, dimethyl amino, diethyl amino, dipropyl amino, methylethyl amino and the like; mercapto; carbonyl; thiocarbonyl; hydroxy; phosphato; phosphoryl and the like.

When aliphatic radicals are the organic radicals in the above formula they may be for example, alkyl, alkenyl, aralkyl and/or aralkenyl.

Any suitable alkyl radical may be the organic radical such as, for example, methyl, ethyl, n-propyl, isopropyl, n-butyl, isobutyl, sec-butyl, t-butyl, n-amyl and various isomers thereof such as, for example, 1-methyl-butyl, 2-methylbutyl, 1,1-dimethylpropyl, 1,2-dimethylpropyl, 2,2-dimethylpropyl, 1-ethylpropyl and the like and the corresponding straight and branched chain isomers of hexyl, heptyl, octyl, nonyl, decyl, undecyl, dodecyl, tridecyl, tetradecyl, pentadecyl, hexadecyl, heptadecyl, octadecyl, nondecyl, eicosyl and the like.

Any suitable alkenyl radical may be the organic radical such as, for example, 2-propenyl, 2-butenyl, 3-butenyl and the corresponding branched chain isomers thereof such as, for example, 2-isobutenyl, 2-dec-butenyl, including 3-pentenyl, 4-pentenyl and the corresponding branched chain isomers thereof; 2-hexenyl, 3-hexenyl, 4-hexenyl, 5-hexenyl and the corresponding branched chain isomers thereof such as, for example, 2,3-dimethyl-2-butenyl, 2,3-dimethyl-3-butenyl, 1-methyl-1-ethyl-2-propenyl and the various isomers of heptenyl, octenyl, nonenyl, decenyl, undecenyl, dodecenyl, tridecenyl, tetradecenyl, pentadecenyl, hexadecenyl, heptadecenyl, octadecenyl, nondecenyl, eicosenyl and the like.

Any suitable aralkyl radical may be the organic radical such as, for example, benzyl, α-phenyl-ethyl, β-phenyl-ethyl, α-phenyl-propyl, β-phenyl-propyl, gamma-phenyl-propyl, α-phenyl-isopropyl, β-phenyl-isopropyl, α-phenyl-isopropyl, α-phenyl-butyl, β-phenyl-butyl, gamma-phenyl-butyl, delta-phenyl-butyl, α-phenyl-isobutyl, β-phenyl-isobutyl, gamma-phenyl-isobutyl, α-phenyl-sec-butyl, β-phenyl-sec-butyl, gamma-phenyl-sec-butyl, β-phenyl-t-butyl, α'-naphthyl-methyl, β'-naphthyl-methyl and the corresponding, α'- and β'-naphthyl derivatives of n-amyl and the various positional isomers thereof such as, for example, 1-methyl-butyl, 2-methyl-butyl, 3-methyl-butyl, 1,1-dimethyl-propyl, 1,2-dimethyl-propyl, 2,2-dimethyl-propyl, 1-ethyl-propyl and said derivatives of the corresponding isomers of hexyl, heptyl, octyl and the like including eicosyl and the corresponding alkyl derivatives of phenanthrene, fluorene, acenaphthene, chrysene, pyrene, triphenylene, naphthacene and the like.

Any suitable aralkenyl radical may be the organic radical such as, for example, β-phenyl-ethenyl, β-phenyl-1-propenyl, α-phenyl-2-propenyl, and phenyl derivatives of the isomers of butenyl, pentenyl, hexenyl, heptenyl up to and including eicosenyl and other aromatic derivatives of alkenyl, that is alkenyl radicals derived from naphthalene, phenanthrene, fluorene, acenaphthene, chrysene, pyrene, triphenylene, naphthacene and the like.

Any suitable cycloalkyl radical may be the organic radical such as, for example, cyclopropyl, cyclobutyl, cycloamyl, cyclohexyl, cycloheptyl, cyclooctyl, cyclononyl, cyclodecyl, cycloundecyl, cyclododecyl, α-cyclopropyl-ethyl, β-cyclopropyl-ethyl, α-cyclobutyl-propyl, β-cyclobutyl-propyl, gamma-cyclobutyl-propyl, α-cycloamyl-isopropyl, β-cycloamyl-isopropyl and the like.

Any suitable cycloalkenyl radical may be the organic radical such as, for example, β-cyclohexyl-ethenyl, α-cyclooctyl-2-propenyl, β-cyclooctyl-2-propenyl, gamma-cyclooctyl-2-propenyl, and the like.

Any suitable aryl radical may be the organic radical such as, for example, phenyl, α-naphthyl, β-naphthyl, α-anthryl, β-anthryl, gamma-anthryl including the various monovalent radicals of indene, isoindene, acenaphthene, fluorene, phenanthrene, naphthacene, chrysene, pyrene, triphenylene and the like.

Any suitable alkaryl radical may be the organic radical such as, for example, o-tolyl, m-tolyl, p-tolyl, 2,3-xylyl, 2,4-xylyl, 2,5-xylyl, 2,6-xylyl, 3,4-xylyl 3,5-xylyl, o-cumenyl, m-cumenyl, p-cumenyl, mesityl, o-ethylphenyl, m-ethylphenyl, p-ethylphenyl, 2-methyl-α-naphthyl, 3-methyl-α-naphthyl, 4-methyl-α-naphthyl, 5-methyl-α-naphthyl, 6-methyl-α-naphthyl, 7-methyl-α-naphthyl, 8-methyl-α-naphthyl, 1-ethyl-β-naphthyl, 3-ethyl-β-naphthyl, 4-ethyl-β-naphthyl, 5-ethyl-β-naphthyl, 6-ethyl-α-naphthyl, 7-ethyl-β-naphthyl, 8-ethyl-β-naphthyl, 2,3-dipropyl-α-naphthyl, 5,8-diisopropyl-β-naphthyl and the like.

The above mentioned triaryl-dihydroxy compounds may be prepared by reacting a compound of the formula

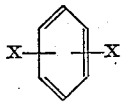

wherein the two X's are in the p- or m-position to one another and stand for

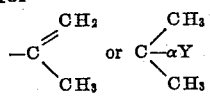

and wherein Y denotes a halogen atom or a hydroxyl, hydroxylalkyl, hydroxyaryl or oxyacyl radical, with more than two mols of the corresponding phenol, eventually in the presence of a catalyst, as described, for instance, in the German application No. F 33,738, filed April 22, 1961, and in the British application No. 14,191, filed April 12, 1962.

Specific examples of such triaryl-dihydroxy compounds may include, for instance:

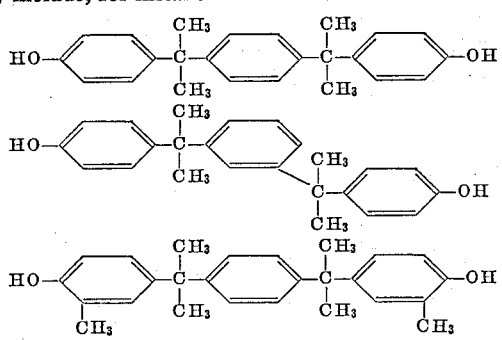

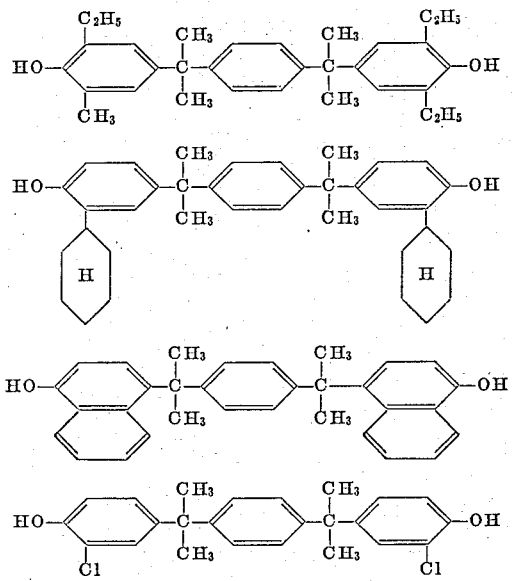

Any suitable dicarboxylic acid having from two to about 22 carbon atoms may be used, such as, for example, succinic acid, adipic acid, sebacic acid, azelaic acid, maleic acid, fumaric acid, itaconic acid, citraconic acid, terephthalic acid, isophthalic acid, phthalic acid, 4,4'-diphenyl-dicarboxylic acid, naphthalene-1,4-dicarboxylic acid, 2,2-(4,4'-dicarboxylic acid-diphenyl)-propane, 4,4'-dicarboxylic acid-diphenyl sulphide, 4,4'-dicarboxylic acid-diphenylsulphone, 4,4'-dicarboxylic acid-diphenyl sulphoxide, hexadecane dicarboxylic acid-(1,16), dinaphthyl-(1,1)-dicarboxylic acid-(5,5') and the like.

Any suitable ester-forming derivatives of dicarboxylic acid may be used, such as, for example, halide, ester, and anhydride derivatives of dicarboxylic acid.

Any suitable ester derivative of dicarboxylic acid may be used, such as, for example, succinic acid diphenyl ester, adipic acid dicyclohexyl ester, isophthalic acid diphenyl ester, sebacic acid diphenyl ester, diphenyl ester of 2,2-(4,4'-dicarboxylic acid-diphenyl)-propane, fumaric acid diphenyl ester, terephthalic acid diphenyl ester, isophthalic acid-di-tert.-butyl ester and the like.

Any suitable halide derivative of dicarboxylic acid may be used, such as, for example, oxalyl chloride, sebacic acid dichloride, tetrachlorophthalic acid, hexachloroendo-methylene-tetrahydrophthalic acid and the like.

Any suitable anhydride derivative of dicarboxylic acid may be used, such as, for example, maleic anyhdride, adipic anhydride, succinic anhydride and the like. Polyanhydride derivatives of dicarboxylic acids may also be used, such as, for example, terephthalic polyanhydride.

Further, any ester-forming derivative of carbonic acid, such as, for example, carbonic acid diesters, phosgene, tri-chloromethyl-chlorocarbonic acid ester, and bis-chlorocarbonic acid esters may be used to prepare the polyesters of the present invention.

Suitable carbonic acid diesters which may be used, include, for example, -dialkyl, -dicycloalkyl, and -diaryl esters, such as, for example, dimethyl-, diethyl-, dipropyl-, dibutyl-, diamyl-, dioctyl-, dicresyl-, dicyclohexyl-, diphenyl-, methyl-ethyl, methyl-propyl, ethyl-propyl, methyl-cyclohexyl, methyl-phenyl, cyclohexyl-phenyl carbonate and the like, as well as the corresponding bis-carbonic esters and the bis-chlorocarbonic acid esters of organic dihydroxy compounds including, for example, the bis-esters of

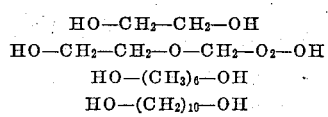

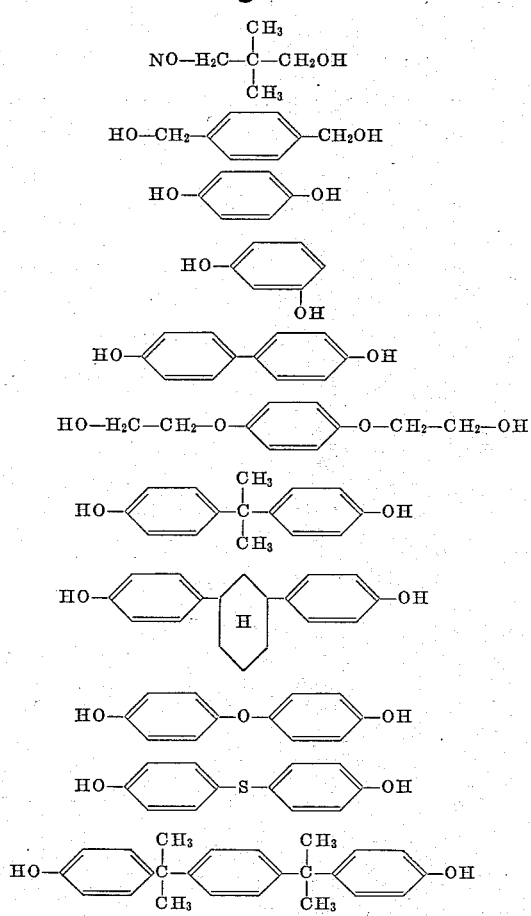

In addition to the triaryldihydroxy compounds any suitable organic dihydroxy compound or hydroxy-carboxylic acid or a functional derivative thereof, such as, for example, glycols, cycloaliphatic and aromatic dihydroxy compounds, especially dihydroxydiphenyl alkanes, ethers, sulphides, sulphones, sulphoxides, and the like, may also be used to produce mixed polyesters.

Any suitable aromatic, aliphatic, cycloaliphatic dihydroxy compound, such as, for example, diethylene glycol, triethylene glycol, polyethylene glycol, thiodiglycol, ethylene dithiodiglycol, the di-, and polyglycols produced from propyleneoxide-1,2 o-, m-, or p-xylylene glycol, propanediol-1,3, butanediol-1,3, butanediol-1,4, 2-methylpropanediol-1,3, pentanediol-1,5, 2-ethylpropanediol-1,3, and the like may be used.

Any suitable dihydroxydiarylalkane may be used, such as, for example, (4,4'-dihydroxydiphenyl)-methane, 2,2-(4,4'-dihydroxydiphenyl) - propane, 1,1-(4,4'-dihydroxydiphenyl)-cyclohexane, 1,1-(4,4'-dihydroxy-3,3'-dimethyldiphenyl)-cyclohexane, 1,1-(2,2'-dihydroxy-4,4'-dimethyldiphenyl)-butane, 2,2-(2,2'-dihydroxy-4,4'-di-tert.-butyldiphenyl)-propane, or 1,1-(4,4'-dihydroxy-diphenyl)-1-phenylethane and the like.

Any suitable dihydroxydiaryl sulphide, sulphone, or sulphoxide may be used, such as, for example, 4,4'-dihydroxy-diphenyl sulphide, 4,4'-dihydroxy-2,2'-dimethyldiphenyl sulphide, 4,4'-dihydroxy-3,3'-dimethyldiphenyl sulphide, 4,4'-dihydroxy-diphenyl sulphone, 2,2'-dihydroxydiphenyl sulphone, 3,3'-dihydroxydiphenyl sulphone, 4,4'-dihydroxy-2,2'-dimethyldiphenyl sulphone, 4,4'-dihydroxy-3,3'-dimethyldiphenyl sulphone, 2,2'-dihydroxy-4,4'-dimethyldiphenyl sulphone, 2,2'-dihydroxy-1,1'-dinaphthyl sulphone, 4,4'-dihydroxydiphenyl sulphoxide and the like.

Suitable dihydroxydiaryl ethers including, for example, 4,4'-dihydroxy diphenyl ether, 4,4'-dihydroxy-2,2'-dimethyldiphenyl ether, 4,4'-dihydroxy-3,3'-dimethyldiphenyl ether and the like may be used.

Suitable hydroxy carbonic acid include, for example, glycolic acid, lactic acid, ε-hydroxy capronic acid, ω-hydroxy undecylinic acid and the like.

The new linear polyesters prepared in accordance with this invention will have repeating ester linkages of the following formulas:

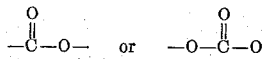

They may be produced, for instance, by polyesterifying about equimolar amounts of a triaryl dihydroxy compound mentioned above or of mixtures of said triaryl dihydroxy compounds or of these compounds with other dihydroxy compounds mentioned above and of one or more dicarboxylic acid mentioned above while splitting off of water, preferably under reduced pressure or/and aceotropic reaction conditions and eventually in the presence of esterifying catalysts. In many cases, however, it is more preferable to produce the polyesters by transesterifying about equimolar amounts of diesters of dicarboxylic acid with the dihydroxy compounds under splitting off the corresponding alcohol or phenol, eventually in the presence of transesterification catalysts and under reduced pressure. Said transesterification reaction can also be used for the production of polycarbonates by starting from carbonic acid diesters mentioned above.

The polyesterification as well as the transesterification takes place under elevated temperatures in the range of about 50 to about 350° C. and especially from about 150 to about 300° C.

As esterification and transesterification catalysts there may be named, for instance, alkali metal and alkaline earth metal compounds of anorganic and organic acids or organic mono- or poly-hydroxy compounds, oxides, hydroxides and hydrides of alkali metals and alkaline earth metals and of other metals such as zinc, cadmium, copper, boron, aluminum, titanium, zirconium, tin, lead, antimony, bismuth, manganese, cobalt and nickel, furthermore salts or esters of such metals, for example, nickel acetate, $Ti(OC_4H_9)_4$, manganese borate, antimony acetate, zinc phenolate, lead benzoate, tin phosphide and the like.

The new polyesters may also be produced by reacting about equimolar amounts of the dihydroxy compounds mentioned above and of dihalides of dicarboxylic acids or of phosgene or of bis-chlorocarbonic acid esters of dihydroxy compounds mentioned above, optionally in the presence of acid binding agents and in the presence of organic solvents.

As acid binding agents there may be named, for instance, aqueous solutions of alkali metal hydroxides and alkaline earth metal hydroxides, and tertiary amines, such as triethyl and tripropyl amine, dimethyl- and diethylaniline, dimethyl- and diethylcyclohexyl amine, pyridine and so on.

Suitable organic solvents include, for example, halogenated aliphatic hydrocarbons such as methylene and ethylene chloride, chloroform, and carbon tetrachloride, esters, ethers and ketones, and aromatic hydrocarbons, such as benzene, toluene and xylene.

Especially suitable methods for producing the new polycarbonates correspond to the processes for the production of polycarbonates described in U.S. specification No. 3,028,365 and the corresponding Canadian specification No. 578,585, in the Canadian specification No. 576,639, in the British specifications 808,486, 809,735, and in the U.S. specifications Nos. 2,946,766, 2,997,459, 2,999,846 and 3,022,272.

Finally there may be mentioned a very suitable method for producing the polyesters of dicarboxylic acids which comprises heating a mixture containing a dicarboxylic acid, a diaryl carbonate and dihydroxy compound in the mole ratio of about 1:2:1, optionally in the presence of transesterification catalysts, under splitting off of carbon dioxide and of the corresponding phenol, corresponding to the process for the production of polyesters described in the copending U.S. application Serial No. 99,034, filed March 29, 1961, particularly the Examples 1, 2, 6, 7 and 8.

Polyesters containing a combination of

and

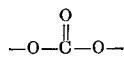

ester linkages can also be prepared according to the process of the present invention by using along with an ester-forming derivative of a dicarboxylic acid, for instance, a dihalide, an ester-forming derivative of carbonic acid, for instance, phosgene or a bis-chlorocarbonic acid ester, as mentioned above.

Such mixed polyesters containing both ester linkages mentioned above may also be produced by heating a mixture containing a dicarboxylic acid, a diarylcarbonate and a dihydroxy compound in the mol ratio of about 1 to more than 2 to more than 1, optionally in the presence of transesterification catalysts, under splitting off of carbon dioxide and the corresponding phenol, also corresponding to the process for the production of polyesters described in the copending U.S. application Serial No. 99,034, filed March 29, 1961, particularly in the Examples 3, 4, 5, 9 and 10.

The polyesters provided by this invention will have a preferred molecular weight higher than about 5,000 and are thermoplastic synthetic resins. Their melting points generally lie above 200° C. and their second order transition temperatures above 100° C. These polyesters are soluble in solvents, such as, for example, phenols, methylene chloride, chloroform, benzene, toluene, chlorobenzene, dioxane, mixtures of phenols and chlorinated hydrocarbons, and the like.

These polyesters can be worked from the melt or from solutions to give films, fibres, or other formed bodies. The stability of films and fibres can usually be considerably improved by orientation, for example, by stretching. These polyesters are very resistant to saponification and take up only a very small amount of water. Low water absorption is important because moisture often influences dimensional and chemical stability as well as electrical and mechanical properties in most thermoplastics. The following Table I compares the take-up of water of a polyester prepared from 2,2-(4,4'-dihydroxy-diphenylene)-propane to the take-up of water of a polyester produced according to the process of the present invention. Table I illustrates that the polyesters prepared in accordance with the invention absorb from about one-fourth to about one-third less moisture than a polyester prepared by a process other than that which is herein disclosed.

The unsaturated polyesters prepared from unsaturated dicarboxylic acids or from derivatives thereof or/and from dihydroxy compounds with unsaturated substituents as mentioned above according to the procedure provided in this application can be hardened by polymerization or mixed polymerization with other polymerizable materials, as known in the art per se, including, for example, styrene, styrenes substituted in the nucleus such as chlorostyrenes, o-, m- and p-alkyl styrenes, for instances, o-, m- and p-methyl styrene, divinyl benzene, acrylic and methacrylic acid esters and amides, esters and polyesters of vinyl or allyl alcohols and ethers, vinyl ketones and the like.

The invention is further illustrated by the following examples in which the parts are by weight unless otherwise specified.

*Example 1*

About 17.3 parts (0.05 mol) $\alpha,\alpha,\alpha',\alpha'$-tetramethyl-$\alpha,\alpha'$-(di-p-hydroxyphenyl)-p-xylene, about 11.35 parts (0.053 mol) diphenylcarbonate and 0.0002 part of the sodium salt of 2,2-(4,4'-dihydroxy-diphenyl)-propane are melted while passing over nitrogen. The main amount of the phenol formed is distilled off from the stirred melt at 200–250° C. at a pressure of 50 mm. mercury within a period of 1.5 hours. The pressure is now reduced to 0.2 mm. mercury within 30 minutes and, at the same time, the temperature of the melt is raised to 300° C. and under these conditions, stirred for 3.5 hours until a pale yellow, highly viscous melt is obtained. The synthetic resin obtained after cooling possesses a relative viscosity of 1.443, measured in 0.5% methylene chloride solution, and can be worked up from solution and from the melt to give foils, fibers and formed bodies.

*Example 2*

About 17.3 parts (0.05 mol) $\alpha,\alpha,\alpha',\alpha'$-tetramethyl-$\alpha,\alpha'$-(di-p-hydroxyphenyl)-p-xylene, 12.34 parts (0.052 mol) dicresyl carbonate and about 0.0002 part of borax are melted under nitrogen and the phenol formed is distilled off at 250° C. under a pressure of 200 mm. mercury. The temperature of the stirred melt is then increased to 300° C., while the pressure is gradually reduced to 0.2 mm. mercury. After heating for a further 4 hours, a synthetic resin is obtained, the properties of which correspond to those described in Example 1. The linear polyester of this example possess a relative viscosity of 1.346, measured in a 0.5% dioxane solution, and melts at about 210° C. to about 240° C.; the refractometrically measured second order transition temperature is 162° C. The polyester is soluble in, for example, methylene chloride, dioxane, chloroform, pyridine, and dimethyl formamide. The foils, fibers and other formed bodies, for example, injection molded parts, produced from the solution or from the melt, possesses outstandingly good mechanical and electrical properties, allow take-up of water and a good resistance to saponification.

*Example 3*

About 17.3 parts of $\alpha,\alpha,\alpha',\alpha'$-tetramethyl-$\alpha,\alpha'$-(di-p-hydroxyphenyl)-p-xylene, about 15.9 parts of isophthalic acid diphenyl ester and about 0.0001 part sodium acetate are melted under nitrogen and part of the phenol formed is distilled off, while stirring at 300° C. The pressure is slowly reduced to 0.3 mm. mercury within 1 hour and the melt stirred for a further 2 hours under these conditions. The synthetic resin obtained after cooling the highly viscous melt possesses a relative viscosity of 1.268, measured in a 0.5% methylene chloride solution, a refractomerically measured second order transition temperature

TABLE I

[Take-up of water at 25° C.]

| Percent relative air humidity | Polyester form | |
|---|---|---|
| | HO—⌬—C(CH₃)(CH₃)—⌬—OH | HO—⌬—C(CH₃)(CH₃)—⌬—C(CH₃)(CH₃)—⌬—OH |
| | *Percent* | *Percent* |
| 40 | 0.16 | 0.04 |
| 60 | 0.24 | 0.07 |
| 80 | 0.30 | 0.10 |
| 95 | 0.34 | 0.13 | of 180° C. and is soluble in, for example, toluene, methylene chloride, chloroform, dioxane and chlorobenzene. The product can be worked up in the usual way from the solution and from the melt to give formed bodies which are characterized by particularly good heat resistance.

Example 4

About 17.3 parts $\alpha,\alpha,\alpha',\alpha'$-tetramethyl-$\alpha,\alpha'$-(di-p-hydroxyphenyl)-p-xylene and about 17.7 parts of sebacic acid-diphenylester are melted while stirring and passing over nitrogen. The main amount of the phenol formed is distilled off at 250° to about 280° C. at a pressure of 50 mm. mercury and than the melt subsequently stirred at 300° C. at a pressure of 0.3 mm. mercury for about 2.5 hours until a highly viscous melt is obtained. The polyester obtained possesses a relative viscosity of 1.439, measured in a 0.5% methylene chloride solution and, on the basis of its good soluble properties, is particularly suitable for use in the field of lacquers.

Example 5

About 17.3 parts $\alpha,\alpha,\alpha',\alpha'$ - tetramethyl - $\alpha,\alpha'$ - (di-p-hydroxyphenyl)-m-xylene, 11.35 parts of diphenylcarbonate and about 0.00015 part of the sodium salt of 2,2-(4,4'-dihydroxydiphenyl)-propane are condensed as described in Example 1 to give a high molecular polycarbonate. The end product has a relative viscosity of 1.385 (measured in 0.5% methylene chloride solution); the refractometrically determined second order transition temperature is 120° C. The synthetic resin shows, in comparison to the product obtained in Example 1, a considerable lower tendency towards crystallization.

Example 6

Into a mixture of about 34.65 parts (0.1 mol) $\alpha,\alpha,\alpha',\alpha'$-tetramethyl-$\alpha,\alpha'$-(di-p-hydroxyphenyl)-p-xylene, about 350 parts methylene chloride, about 500 parts water, and about 8.1 parts of sodium hydroxide there are passed at 25° C., with stirring for 50 minutes, about 12.85 parts (0.13 mol) phosgene, whereby at the same time, about an additional 12.2 parts of sodium hydroxide (in all about 0.337 mol) are added dropwise in the form of a 50% aqueous solution. About 0.04 parts triethylamine are subsequently added. The organic solution of the polycarbonate formed becomes viscous in about 30 minutes. It is washed with dilute sodium hydroxide solution, dilute hydrochloric acid and water. The polycarbonate is isolated by evaporating off the solvent. The polycarbonate has a relative viscosity of 1.36, measured in 0.5% methylene chloride solution. It can be worked up to transparent formed bodies of great stability from solutions and melts.

Example 7

Into a solution of about 17.32 parts (0.05 mol), $\alpha,\alpha,\alpha',\alpha'$-tetrametyl - $\alpha,\alpha'$ - (di-p-hydroxyphenyl)-p-xylene and about 18.0 parts (0.0505 mol) of the bis-chlorocarbonic acid ester of 2,2-(4,4'-dihydroxy-diphenyl)-propane in about 300 parts anhydrous methylene chloride, there is added dropwise, within about 45 minutes at about 0° C., a solution of about 12 parts pyridine into about 40 parts methylene chloride. After standing for about 12 hours at room temperature, the solution is first washed with hydrochloric acid and then with water. The polycarbonate is isolated in the manner described in Example 6. It has a relative viscosity of 1.29, measured in a 0.5% methylene chloride solution. It can be worked to formed bodies from the solution and from the melt.

Example 8

A mixture of 34.65 parts by weight $\alpha,\alpha,\alpha',\alpha'$-tetramethyl-$\alpha,\alpha'$-di(p-hydroxyphenyl) - p - xylene (0.1 mol), 1.66 parts by weight isophthalic acid (0.01 mol), 24.8 parts by weight diphenylcarbonate (0.11 mol plus 5 percent excess) and 0.0008 part by weight potassium acetate is heated to 290° C. under a stream of nitrogen and under reflux while stirring. After about 2 hours the evolution of carbon dioxide is finished. Then the bulk of the phenol split off is distilled off at 250° C. while decreasing the pressure during one hour to 10 mm. mercury. The reaction mixture is continued to be stirred at 290° C. under 0.4 mm. mercury until a highly viscous, slightly yellowish melt of the mixed polyester is obtained. It has a relative viscosity measured in a 0.5 percent methylene chloride solution at 25° C. of 1.293 and is soluble in, for example, methylene chloride, chloroform and toluene.

In the foregoing examples the term relative viscosity means the ratio $\eta:\eta_0$, wherein $\eta$ is the viscosity of a 0.5 percent solution of the polyester and $\eta_0$ is the viscosity of the pure solvent, both measured at the given temperature (25° C.).

It is understood that any of the other suitable organic triarylhydroxy compounds, dicarboxylic acids or their ester-forming derivatives, carbonic acid derivatives and the like described herein, can be substituted for the particular ones employed in the preceding examples with satisfactory results providing the teachings of the preceding disclosure are followed.

Although the invention has been described in considerable detail in the foregoing for the purpose of illustration, it is to be understood that such detail is solely for this purpose and that variations can be made therein by those skilled in the art without departing from the spirit and scope of the invention except as set forth in the claims.

We claim:

1. A polyester which comprises the repeating units selected from the group consisting of

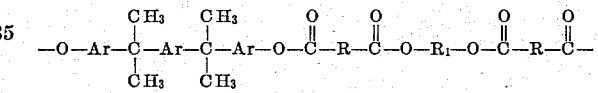

and

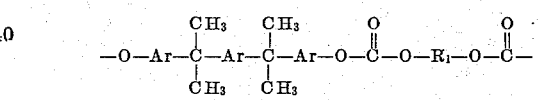

wherein Ar is a radical selected from the group consisting of phenylene and naphthylene; R is a radical selected from the group consisting of alkylene radicals having from about 2 to about 16 carbon atoms,

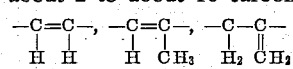

phenylene, diphenylene, naphthylene, dinaphthylene, bis-(4-phenylene)-propane, bis-(4-phenylene)-sulfide, bis-(4-phenylene)-sulfone and bis-(4-phenylene)-sulfoxide; $R_1$ is a radical selected from the group consisting of

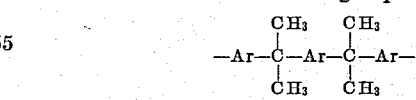

bis-(phenylene)-alkanes, bis-(phenylene)-sulfones, bis-(phenylene) - sulfoxides, bis-(phenylene) - sulfides, bis-(phenylene)-ethers, and the residue remaining after the removal of the two hydroxyl groups of a glycol.

2. A polyester which comprises the repeating units

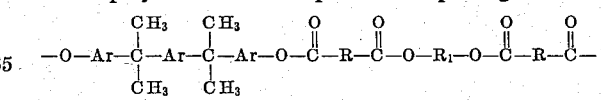

wherein Ar is a radical selected from the group consisting of phenylene and naphthylene; R is a radical selected from the group consisting of alkylene radicals having from about 2 to about 16 carbon atoms,

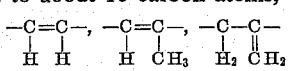

phenylene, diphenylene, naphthylene, dinaphthylene, bis-(4-phenylene)-propane, bis-(4-phenylene)-sulfide, bis-(4- phenylene)-sulfone and bis-(4-phenylene)-sulfoxide, $R_1$ is a radical selected from the group consisting of

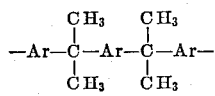

bis-(phenylene) - alkanes, bis-(phenylene)-sulfones, bis-(phenylene)-sulfoxides, bis - (phenylene) - sulfides, bis-(phenylene)-ethers and the residue remaining after the removal of the two hydroxyl groups of a glycol.

3. A polyester which comprises the repeating units

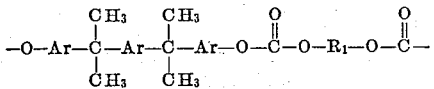

wherein Ar is a radical selected from the group consisting of phenylene and naphthylene; and $R_1$ is a radical selected from the group consisting of

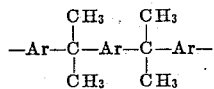

bis-(phenylene)-alkanes, bis - (phenylene) - sulfones, bis-(phenylene)-sulfoxides, bis - (phenylene) - sulfides, bis-(phenylene)-ethers, and the residue remaining after the removal of the two hydroxyl groups of a glycol.

4. The polyester of claim 1 wherein the Ar radical is substituted.

5. The polyester of claim 1 wherein the Ar radical is unsubstituted.

References Cited by the Examiner

UNITED STATES PATENTS

| | | | |
|---|---|---|---|
| 2,247,402 | 7/1941 | Perkins et al. | 260—619 |
| 2,285,626 | 6/1942 | Taylor et al. | 260—619 |
| 2,865,887 | 12/1958 | MacKenzie | 260—619 |
| 3,030,331 | 4/1962 | Goldberg | 260—47 |
| 3,062,895 | 11/1962 | Martin et al. | 260—619 |
| 3,062,896 | 11/1962 | Davis | 260—619 |
| 3,094,508 | 6/1963 | Butterworth et al. | 260—47 X |
| 3,112,292 | 11/1963 | Bottenbruch et al. | 260—47 X |

FOREIGN PATENTS 1,293,289   4/1962   France.

LEON J. BERCOVITZ, *Primary Examiner.*

DONALD E. CZAJA, *Examiner.*

J. J. KLOCKO, *Assistant Examiner.*